(12) United States Patent
Lee et al.

(10) Patent No.: US 9,318,102 B2
(45) Date of Patent: Apr. 19, 2016

(54) METHOD AND APPARATUS FOR CORRECTING SPEECH RECOGNITION ERROR

(71) Applicant: POSTECH ACADEMY—INDUSTRY FOUNDATION, Gyeongbuk (KR)

(72) Inventors: Geun Bae Lee, Gyeongsangbuk-do (KR); Jun Hwi Choi, Gyeongsangbuk-do (KR); In Jae Lee, Seoul (KR); Dong Hyeon Lee, Gyeongsangnam-do (KR); Hong Suck Seo, Gyeonggi-do (KR); Yong Hee Kim, Seoul (KR); Seong Han Ryu, Seoul (KR); Sang Jun Koo, Seoul (KR)

(73) Assignee: POSTECH ACADEMY—INDUSTRY FOUNDATION, Gyeongbuk (KR)

( * ) Notice: Subject to any disclaimer, the term of this patent is extended or adjusted under 35 U.S.C. 154(b) by 131 days.

(21) Appl. No.: 14/087,944

(22) Filed: Nov. 22, 2013

(65) Prior Publication Data

US 2014/0163975 A1 Jun. 12, 2014

(30) Foreign Application Priority Data

Dec. 7, 2012 (KR) ........................ 10-2012-0141972

(51) Int. Cl.
*G10L 15/00* (2013.01)
*G10L 15/01* (2013.01)
*G10L 15/06* (2013.01)

(52) U.S. Cl.
CPC *G10L 15/01* (2013.01); *G10L 15/06* (2013.01)

(58) Field of Classification Search
CPC ......... G10L 15/26; G10L 13/00; G10L 15/22; G10L 13/043; G10L 15/063; G10L 15/1815; G10L 15/30; G06F 17/2827; G06F 17/2785; G06F 17/2818

USPC ............... 704/231, 3, 277, 275, 257, 2, 10; 707/740

See application file for complete search history.

(56) References Cited

U.S. PATENT DOCUMENTS 7,539,619 B1 * 5/2009 Seligman ............ G06F 17/2755
704/2
8,340,958 B2 * 12/2012 Gruhn .................. G06F 3/0237
704/1

(Continued)

FOREIGN PATENT DOCUMENTS

JP       02171876 A     7/1990
JP    2005234236 A     9/2005

(Continued)

OTHER PUBLICATIONS

Translation of Office Action issued in corresponding Japanese Application No. 2013-243198 dated Nov. 11, 2014 (3 pages).

*Primary Examiner* — Michael Colucci
(74) *Attorney, Agent, or Firm* — Osha Liang LLP

(57) ABSTRACT

Disclosed are a speech recognition error correction method and an apparatus thereof. The speech recognition error correction method includes determining a likelihood that a speech recognition result is erroneous, and if the likelihood that the speech recognition result is erroneous is higher than a predetermined standard, generating a parallel corpus according to whether the speech recognition result matches the correct answer corpus, generating a speech recognition model based on the parallel corpus, and correcting an erroneous speech recognition result based on the speech recognition model and the language model. Accordingly, speech recognition errors are corrected.

10 Claims, 5 Drawing Sheets

(56) References Cited

U.S. PATENT DOCUMENTS

| | | | | |
|---|---|---|---|---|
| 8,606,559 | B2* | 12/2013 | Jin | G06F 17/2755 704/2 |
| 8,645,119 | B2* | 2/2014 | Och | G06F 17/2845 704/2 |
| 8,788,258 | B1* | 7/2014 | Bangalore | G11B 27/105 704/2 |
| 8,972,268 | B2* | 3/2015 | Waibel | G10L 15/265 704/2 |
| 2007/0043567 | A1* | 2/2007 | Gao | G10L 15/26 704/257 |
| 2008/0319962 | A1* | 12/2008 | Riezler | G06F 17/30672 |
| 2009/0125477 | A1* | 5/2009 | Lu | G06F 17/30681 |
| 2009/0306981 | A1* | 12/2009 | Cromack | G06F 17/30743 704/235 |
| 2010/0145680 | A1* | 6/2010 | Yun | G10L 15/1815 704/10 |
| 2011/0238406 | A1* | 9/2011 | Chen | G06F 17/2735 704/3 |
| 2012/0173244 | A1* | 7/2012 | Kwak | G10L 15/22 704/275 |
| 2012/0290302 | A1* | 11/2012 | Yang | G10L 15/08 704/236 |
| 2013/0091138 | A1* | 4/2013 | Liensberger | G06F 17/30525 707/740 |
| 2013/0275118 | A1* | 10/2013 | DeNero | G06F 17/2827 704/3 |
| 2014/0114642 | A1* | 4/2014 | van den Oever | G06F 17/2818 704/2 |

FOREIGN PATENT DOCUMENTS

| | | |
|---|---|---|
| JP | 2008033198 A | 2/2008 |
| JP | 2009198647 A | 9/2009 |
| JP | 2010134074 A | 6/2010 |
| JP | 2011002656 A | 1/2011 |
| KR | 1020060057921 A | 5/2006 |
| WO | 2012004955 A | 1/2012 |

* cited by examiner

METHOD AND APPARATUS FOR CORRECTING SPEECH RECOGNITION ERROR

CLAIM FOR PRIORITY

This application claims priority to Korean Patent Application No. 10-2012-0141972, filed on Dec. 7, 2012 in the Korean Intellectual Property Office (KIPO), the entire contents of which are hereby incorporated by reference.

BACKGROUND

1. Technical Field

Example embodiments of the present invention relate in general to a speech recognition error correction method and apparatus, and more specifically, to a speech recognition error correction method and apparatus that correct the error generated in the speech recognition apparatus.

2. Related Art

Due to the proliferation of mobile apparatuses such as smart phones and tablet PCs, interest in speech recognition application software (for example, a conversation system such as SIRI of Apple Inc.) is increasing. However, existing speech recognition technology is not very accurate, speech recognition errors occur frequently, and this causes the speech recognition application software to malfunction.

SUMMARY

In order to overcome the above and other drawbacks of the conventional art, example embodiments of the present invention provide a speech recognition error correction method for correcting a speech recognition error based on a parallel corpus.

In order to overcome the above and other drawbacks of the conventional art, example embodiments of the present invention provide a speech recognition error correction apparatus for correcting a speech recognition error based on a parallel corpus.

In some example embodiments, a speech recognition error correction method performed by a speech recognition error correction apparatus includes determining a likelihood that a speech recognition result is erroneous based on a language model learned through a correct answer corpus and a domain corpus, if the likelihood that the speech recognition result is erroneous is higher than a predetermined standard, generating a parallel corpus according to whether the speech recognition result matches the correct answer corpus, generating a speech recognition model based on the parallel corpus, and correcting an erroneous speech recognition result based on the speech recognition model and the language model.

Here, the determining of the likelihood that a speech recognition result is erroneous may include determining a likelihood that a speech recognition result is erroneous based on likelihood of generating the speech recognition result.

Here, the generating of the parallel corpus may include detecting a correct answer pair from the correct answer corpus and the speech recognition result, detecting an incorrect answer pair from the correct answer corpus and the speech recognition result, and generating the parallel corpus based on the correct answer corpus, the speech recognition result, the correct answer pair, and the incorrect answer pair.

Here, the generating of the speech recognition model may include detecting a first syntax before speech recognition from the parallel corpus, detecting a second syntax after speech recognition from the parallel corpus, calculating a speech recognition rate between the first syntax and the second syntax, and generating the speech recognition model based on the first syntax, the second syntax, and the speech recognition rate.

Here, the correcting of the erroneous speech recognition result may include generating a graph according to a correspondence relation between the first syntax and the second syntax, detecting a route with minimum errors from the graph, and correcting the erroneous speech recognition result based on the detected route.

Here, the generating of the graph may include assuming that a certain second syntax is a certain first syntax if the certain first syntax corresponding to the certain second syntax does not exist.

Here, the correcting of the erroneous speech recognition result based on the detected route may include correcting the erroneous speech recognition result without a rearrangement process according to the language model.

In other example embodiments, a speech recognition error correction apparatus includes a processing unit configured to determine a likelihood that a speech recognition result is erroneous based on a language model learned through a correct answer corpus and a domain corpus, and if the likelihood that the speech recognition result is erroneous is higher than a predetermined standard, generate a parallel corpus according to whether the speech recognition result matches the correct answer corpus, generate a speech recognition model based on the parallel corpus, and correct an erroneous speech recognition result based on the speech recognition model and the language model; and a storage unit configured to store information to be processed and information processed in the processing unit.

Here, the processing unit may determine the likelihood that a speech recognition result is erroneous based on likelihood of generating the speech recognition result.

Here, the processing unit may detect a correct answer pair from the correct answer corpus and the speech recognition result, detect an incorrect answer pair from the correct answer corpus and the speech recognition result, and generate the parallel corpus based on the correct answer corpus, the speech recognition result, the correct answer pair, and the incorrect answer pair.

Here, the processing unit may detect a first syntax before speech recognition from the parallel corpus, detect a second syntax after speech recognition from the parallel corpus, calculate a speech recognition rate between the first syntax and the second syntax, and generate the speech recognition model based on the first syntax, the second syntax, and the speech recognition rate.

Here, the processing unit may generate a graph according to a correspondence relation between the first syntax and the second syntax, detect a route with minimum errors from the graph, and correct the erroneous speech recognition result based on the detected route.

Here, the processing unit may generate the graph assuming that a certain second syntax is a certain first syntax if the certain first syntax corresponding to the certain second syntax does not exist.

Here, the processing unit may correct the erroneous speech recognition result without a rearrangement process according to the language model.

According to the present invention, an error generated by speech recognition can be corrected so that speech recognition accuracy can be improved.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
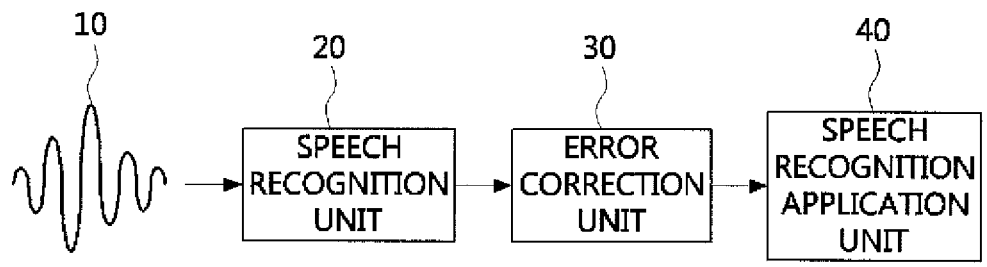
FIG. 1 is a block diagram illustrating a speech recognition apparatus.

Accordingly, while the invention can be embodied in various different forms, specific embodiments thereof are shown by way of example in the drawings and will herein be described in detail. It should be understood, however, that there is no intent to limit the invention to the particular forms disclosed. On the contrary, the invention is to cover all modifications, equivalents, and alternatives falling within the spirit and scope of the appended claims.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, preferred embodiments will be described in more detail with reference to the accompanying drawings. Throughout the drawings and detailed description, parts of the invention are consistently denoted by the same respective reference numerals.

FIG. 1 is a block diagram illustrating a speech recognition apparatus.

With reference to FIG. 1, the speech recognition apparatus may include a speech recognition unit 20, an error correction unit 30, and a speech recognition application unit 40. The speech recognition unit 20 may receive the speech signal 10, recognize the speech signal 10, and generate a speech recognition result (text). The error correction unit 30 may analyze whether the speech recognition result includes an error and correct the error if included. The error correction unit 30 may have the same configuration as a speech recognition error correction apparatus 30 illustrated in FIGS. 8 and 9.

The speech recognition application unit 40 may apply the speech recognition result to various applications. The application may refer to a speech word processor, a speech conversation system, or the like.

Figure 2:
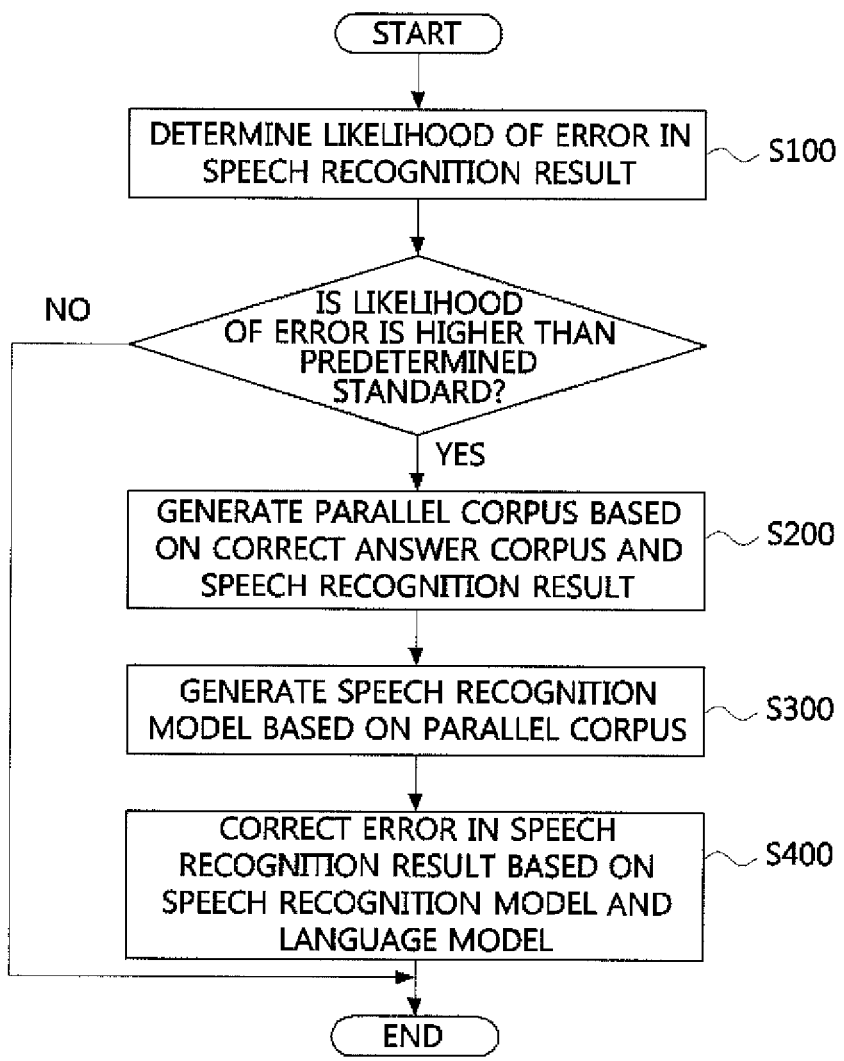
FIG. 2 is a flowchart illustrating a speech recognition error correction method according to an embodiment of the present invention.

FIG. 2 is a flowchart illustrating a speech recognition error correction method according to an embodiment of the present invention.

With reference to FIG. 2, the speech recognition error correction method includes determining a likelihood that a speech recognition result is erroneous based on a language model learned through a correct answer corpus and a domain corpus in step 100, if the likelihood that the speech recognition result is erroneous is higher than a predetermined standard, generating a parallel corpus based on whether the speech recognition result matches the correct answer corpus in step 200, generating a speech recognition model based on the parallel corpus in step 300, and correcting an erroneous speech recognition result based on the speech recognition model and the language model in step 400. Here, each operation of the speech recognition error correction method may be performed by the speech recognition error correction apparatus 30 illustrated in FIGS. 8 and 9.

The speech recognition error correction apparatus may determine whether the speech recognition result includes an error or not (i.e., the likelihood that it is erroneous) in step 100. The speech recognition error correction apparatus may determine the likelihood that the speech recognition result is erroneous using the language model learned through the high-capacity domain corpus and the correct answer corpus, which relate to the speech recognition result. Here, an N-gram may be used as the language model, and specifically, a bigram or a trigram may be used.

For example, if the speech recognition result is "an apple deliciously ate", the speech recognition error correction apparatus may calculate a likelihood of generating "an apple deliciously" and "deliciously ate" by the bigram, and a likelihood of generating "apple deliciously ate" by the Ingram. At this point, because the language model is learned through the correct answer corpus, the bigram "an apple deliciously" has a low likelihood of being generated, and therefore the speech recognition error correction apparatus may determine "an apple deliciously" as a syntax with a high likelihood of error. As a result, the speech recognition error correction apparatus may determine "an apple deliciously ate" as a syntax with a high likelihood of error.

If the likelihood that the speech recognition result is erroneous is higher than a predetermined standard, the speech recognition error correction apparatus may generate a parallel corpus according to the identity of the correct answer corpus and the speech recognition result in step 200.

Figure 3:
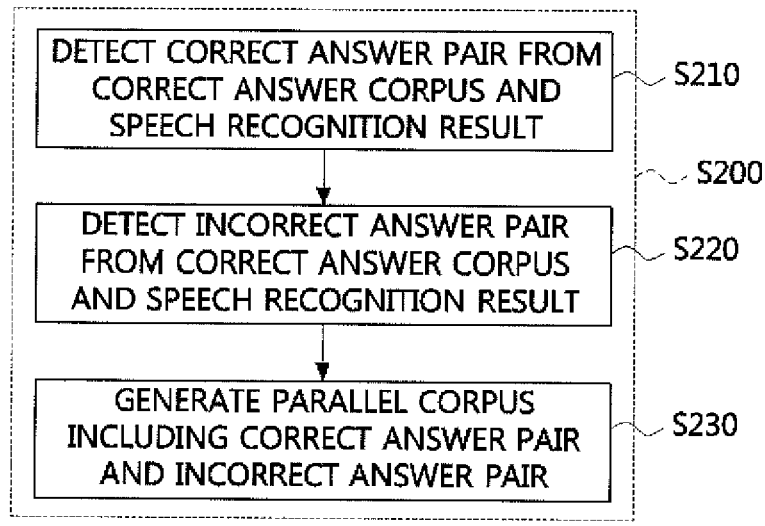
FIG. 3 is a flowchart illustrating an operation of generating a parallel corpus in a speech recognition error correction method according to an embodiment of the present invention.

FIG. 3 is a flowchart illustrating an operation of generating a parallel corpus in a speech recognition error correction method according to an embodiment of the present invention.

With reference to FIG. 3, generating the parallel corpus in step 200 includes detecting a correct answer pair from the correct answer corpus and the speech recognition result in step 210, detecting an incorrect answer pair from the correct answer corpus and the speech recognition result in step 220, and generating a parallel corpus based on the correct answer corpus, the speech recognition result, the correct answer pair, and the incorrect answer pair in step 230.

The speech recognition error correction apparatus may detect the correct answer pair from an existing parallel corpus including the correct answer corpus and the speech recognition result in step 210.

TABLE 1

| Existing Parallel Corpus (Error, Correct) | |
|---|---|
| an apple deliciously ate | an apple was deliciously eaten |
| an apple is reduce | an apple is red |
| a poison was put of an apple | a poison was put into an apple |

Table 1 is an existing parallel corpus including a correct answer corpus and a speech recognition result. Here, "an apple deliciously ate", "an apple is reduce", and "a poison was put of an apple" on the left column refer to speech recognition results, and "an apple was deliciously eaten", "an apple is red", "a poison was put into an apple" in the right column refer to correct answer corpuses.

For example, since "an apple" of the speech recognition result in the second row of Table 1 is the same as "an apple" of the correct answer corpus, the speech recognition error correction apparatus may detect "an apple" as a correct answer pair. Further, since "a poison was put" of the speech recognition result in the third row of Table 1 is the same as "a poison was put" of the correct answer corpus, the speech recognition error correction apparatus may detect "a poison was put" as a correct answer pair.

The speech recognition error correction apparatus may detect an incorrect answer pair from the existing parallel corpus including the correct answer corpus and the speech recognition result in step 220.

For example, since "reduce" of the speech recognition result in the second row of Table 1 and "red" of the correct answer corpus are not the same, the speech recognition error correction apparatus may detect "reduce, red" as an incorrect answer pair. Further, since "of an apple" of the speech recognition result in the third row of Table 1 and "into an apple" of the correct answer corpus are not the same, the speech recognition error correction apparatus can detect "of an apple, into an apple" as an incorrect answer pair.

Here, it is described that the step 220 is performed after the step 210, but the step 210 may be performed after the step 220.

The speech recognition error correction apparatus may generate an extended parallel corpus including a correct answer corpus, a speech recognition result, a correct answer pair, and an incorrect answer pair in step 230.

TABLE 2

| Extended Parallel Corpus (Error, Correct) | | Remarks |
|---|---|---|
| an apple deliciously ate | an apple was deliciously eaten | 1. |
| an apple is reduce | an apple is red | 2. |
| a poison was put of an apple | a poison was put into an apple | 3. |
| ~~an apple~~ | ~~an apple was~~ | 4. this is an incorrect answer pair to be added in No. 1, but excluded due to the correct answer pair of No. 6. |
| deliciously | deliciously | 5. correct answer pair added in No. 1 |
| an apple | an apple | 6. correct answer pair added in No. 2 |
| is reduce | is red | 7. incorrect answer pair added in No. 2 |
| of an apple | into an apple | 8. incorrect answer pair added in No. 3 |
| a poison was put | a poison was put | 9. correct answer pair added in No. 3 |

Table 2 presents extended parallel corpuses including correct answer corpuses, speech recognition results, correct answer pairs, and incorrect answer pairs. In Remarks 1, 2, and 3, "an apple deliciously ate", "an apple is reduce", "a poison was put of an apple" presented in the left column refer to speech recognition results, and "an apple was deliciously eaten", "an apple is red", and "a poison was put into an apple" in the right column refer to correct answer corpuses.

In Remarks 5, 6, and 9, "deliciously, deliciously", "an apple, an apple", and "a poison to was put, a poison was put" refer to correct answer pairs. In Remarks 7 and 8, "reduce, red" and "of an apple, into an apple" refer to incorrect answer pairs.

That is, the speech recognition error correction apparatus may generate extended parallel corpuses including the correct answer corpuses, the speech recognition results, the correct answer pairs and the incorrect answer pairs as presented in Table 2.

Here, on the first row of Table 1, the speech recognition result of "an apple" and the correct answer corpus of "an apple was" are not the same. However, since "an apple" is detected as a correct pair (Remark 6 of Table 2), the speech recognition error correction apparatus does not detect "an apple, an apple was" as an incorrect answer pair (see Remark 2 of Table 2). That is, if text included in an incorrect answer pair is included in a correct answer pair, the speech recognition error correction apparatus does not detect the corresponding incorrect answer pair as an incorrect answer pair. Accordingly, the speech recognition error correction apparatus can reduce error generation.

The speech recognition error correction apparatus may generate a speech recognition model based on a parallel corpus in step 300.

Figure 4:
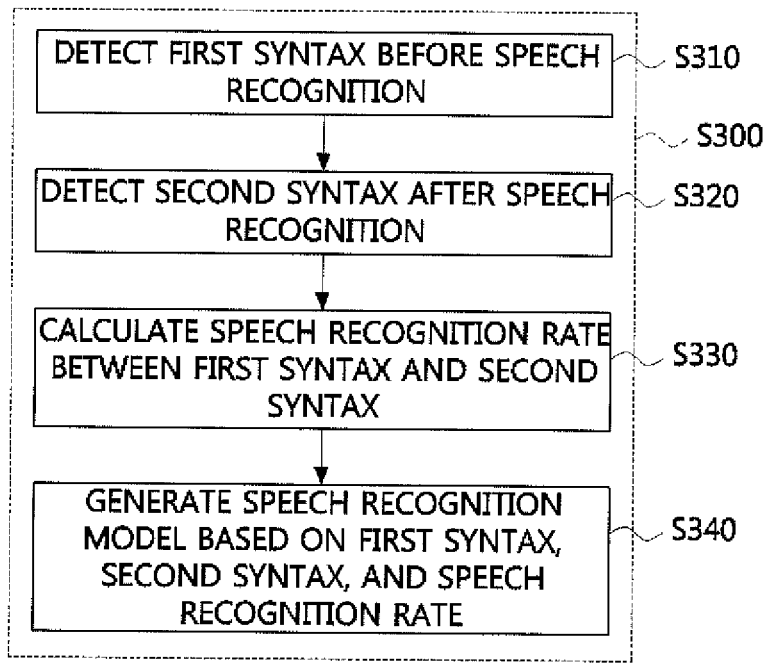
FIG. 4 is a flowchart illustrating an operation of generating a speech recognition model in a speech recognition error correction method according to an embodiment of the present invention.

FIG. 4 is a flowchart illustrating an operation of generating a speech recognition model in a speech recognition error correction method according to an embodiment of the present invention.

With reference to FIG. 4, generating a speech recognition model in step 300 includes detecting a first syntax before speech recognition from a parallel corpus in step 310, detecting a second syntax after speech recognition from the parallel corpus in step 320, calculating speech recognition rate between the first syntax and the second syntax in step 330, and generating the speech recognition model based on the first syntax, the second syntax, and the speech recognition rate.

The speech recognition error correction apparatus may detect a first syntax before speech recognition from an extended parallel corpus (that is, see Table 2) in step 310. That is, the speech recognition error correction apparatus may detect a correct answer corpus included in the extended parallel corpus as the first syntax.

The speech recognition error correction apparatus may detect a second syntax after speech recognition from the extended parallel corpus (that is, see Table 2) in step 320. That is, the speech recognition error correction apparatus may detect the speech recognition result included in the extended parallel corpus as the second syntax.

Here, it is described that the step 320 is performed after the step 310, but the step 310 may be performed after the step 320.

The speech recognition error correction apparatus may calculate a speech recognition rate between the first syntax and the second syntax in step 330. That is, the speech recognition error correction apparatus may calculate a speech recognition rate in which the first syntax is recognized as the second syntax, and may calculate the speech recognition rate using the extended parallel corpus at this point.

The speech recognition error correction apparatus may generate a speech recognition model based on the first syntax, the second syntax, and the speech recognition rate in step 340.

Figure 5:
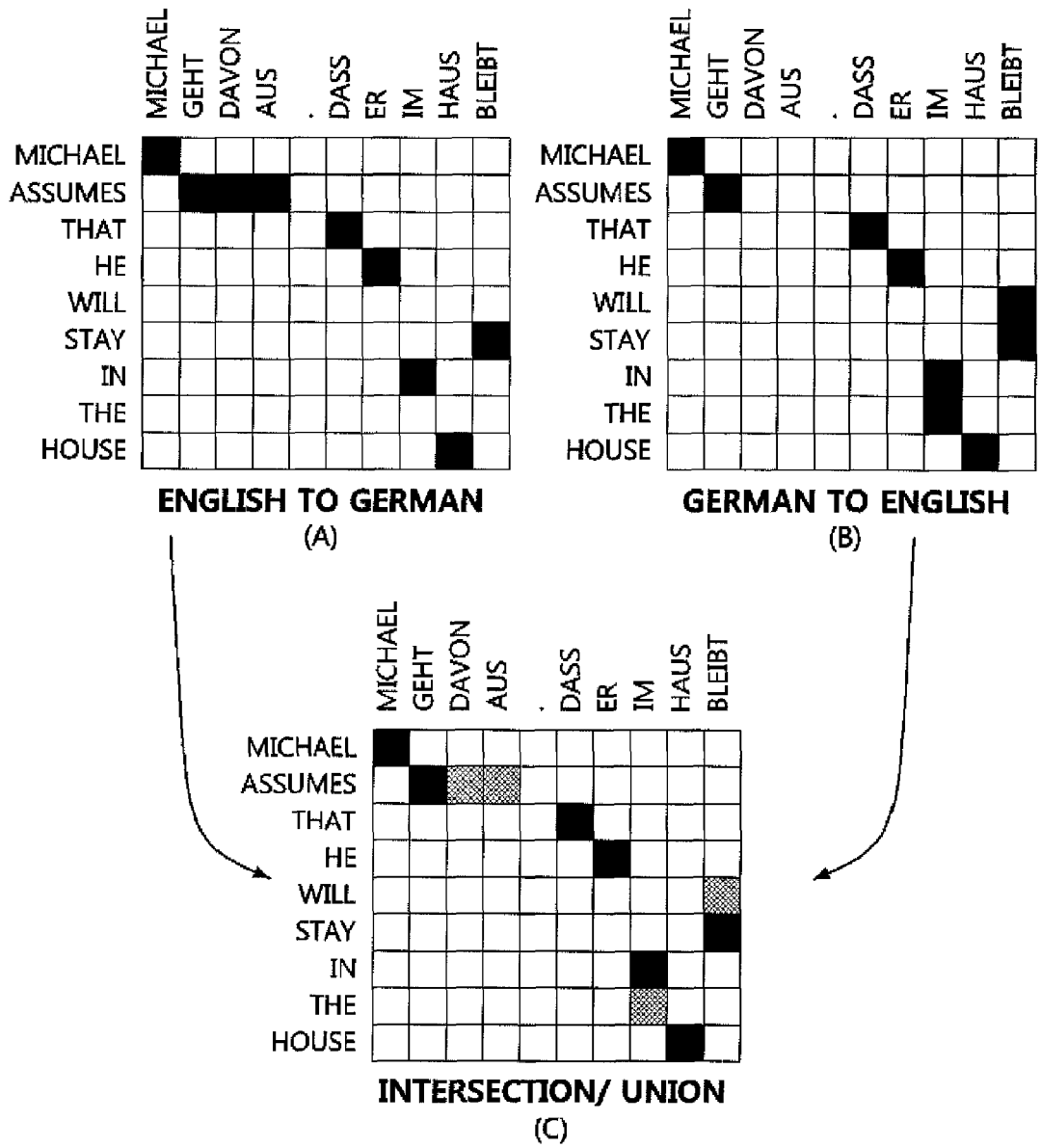
FIG. 5 is a diagram schematically illustrating a speech recognition model.

FIG. 5 is a diagram schematically illustrating a speech recognition model.

With reference to FIG. 5, FIG. 5A shows a speech recognition model in which English is translated into German, FIG. 5B shows a speech recognition model in which German is translated into English, and FIG. 5C shows a speech recognition model in which the speech recognition models of FIGS. 5A and 5B are combined.

In the speech recognition model in FIG. 5A, rows indicate English (corresponding to the first syntax), and columns indicate German (corresponding to the second syntax). Here, the black cells denote a high likelihood that the first syntax translates into the second syntax. (For example, it is highly likely that 'that' translates into 'dass'.)

In the speech recognition model of FIG. 5B, rows indicate English (corresponding to the second syntax), and columns indicate German (corresponding to the first syntax). Here, the black cells denote a high likelihood that the first syntax translates into the second syntax (For example, it is highly likely that 'geht' translates into 'assumes'.)

The speech recognition model of FIG. 5C is obtained by combining the speech recognition model of FIG. 5A and the speech recognition model of FIG. 5B. Cells at which it is highly likely that the first syntax translates into the second syntax in both of FIGS. 5A and 5B are indicated in black (for example, 'that'→'dass'), and cells at which there is a high likelihood of the first syntax translating into the second syntax in only one of FIGS. 5A and 5B are indicated in gray ('the'→'im').

In this manner, the speech recognition error correction apparatus may generate the speech recognition model. That is, the speech recognition error correction apparatus may generate a matrix by setting the first syntax (for example, the correct answer corpus) as rows, and setting the second syntax (for example, the speech recognition result) corresponding to the first syntax as columns, and may generate the first speech recognition model by indicating, in black, cells in which the first syntax is highly likely to be recognized as the second syntax.

The speech recognition error correction apparatus may generate a matrix by setting a first syntax (for example, a speech recognition result) as columns, and setting a second syntax (for example, a correct answer corpus) corresponding to the first syntax as rows, and may generate a second speech recognition model by indicating, in black, cells in which the first syntax is highly likely to be recognized as the second syntax.

The speech recognition error correction apparatus may generate a final speech recognition model by combining the first speech recognition model and the second speech recognition model.

The speech recognition error correction apparatus may correct an erroneous speech recognition result based on the speech recognition model and the language model in step 400.

Figure 6:
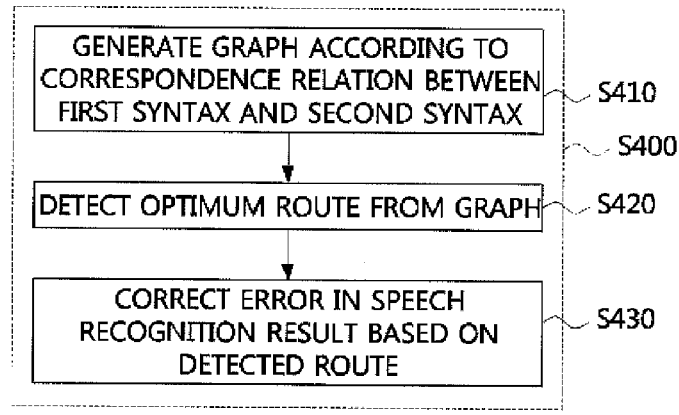
FIG. 6 is a flowchart illustrating an operation of correcting an error of a speech recognition result in a speech recognition error correction method according to an embodiment of the present invention.

FIG. 6 is a flowchart illustrating an operation of correcting an error of a speech recognition result in a speech recognition error correction method according to an embodiment of the present invention.

With reference to FIG. 6, correcting an erroneous speech recognition result in step 400 may include generating a graph according to a correspondence relation between a first syntax and a second syntax in step 410, detecting a route having minimum errors from the graph in step 420, and correcting an erroneous speech recognition result based on the detected route in step 430.

The speech recognition error correction apparatus may generate a graph according to a correspondence relation between a first syntax and a second syntax in step 410.

Figure 7:
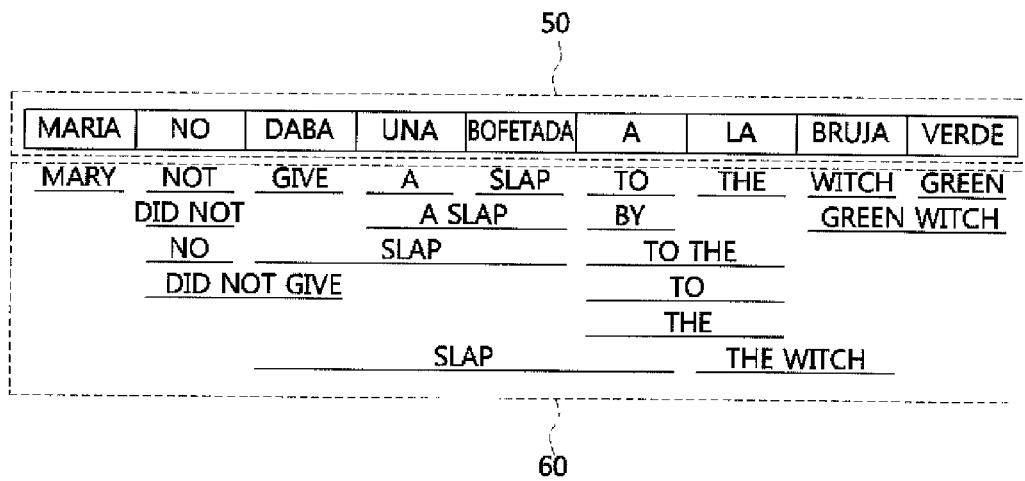
FIG. 7 is a diagram schematically illustrating a graph according to a correspondence relation of syntaxes.

FIG. 7 is a diagram schematically illustrating a graph according to a correspondence relation of syntaxes.

With reference to FIG. 7, a 'code 50 (for example, a first syntax)' refers to Spanish, and a 'code 60 (for example, second syntax)' refers to English. That is, 'Maria', 'no', and 'did not' correspond to 'Mary', 'not', and 'no', respectively.

In this manner, the speech recognition error correction apparatus may detect second syntaxes (that is, speech recognition results) corresponding to first syntaxes (that is, correct answer corpuses), respectively, and may generate a graph according to correspondence relations between the first syntaxes and the second syntaxes based on the detection.

At this point, if a certain first syntax corresponding to a certain second syntax does not exist, the speech recognition error correction apparatus may assume that the certain second syntax is the certain first syntax. That is, if the certain first syntax corresponding to the certain second syntax does not exist, a part on the graph with regard to the certain first syntax is regarded as a blank, and the speech recognition error correction apparatus may assume the certain second syntax to be the first syntax in order to avoid the blank.

For example, if a certain first syntax corresponding to a certain second syntax of 'of an apple' does not exist, the speech recognition error correction apparatus may assume the certain second syntax of 'of an apple' to be the certain first syntax.

The speech recognition error correction apparatus may detect a route with minimum errors from the graph in step 420. At this point, the speech recognition error correction apparatus may detect the route with minimum errors through known technology (for example, a viterbi search).

The speech recognition error correction apparatus may correct errors of the speech recognition result based on the detected route in step 430. That is, the speech recognition error correction apparatus may compare the speech recognition result with the detected route, and correct the speech recognition result based on the detected route, if there is difference according to the comparison. For example, if the speech recognition result is "an apple deliciously ate", the speech recognition error correction apparatus may correct the speech recognition result to "an apple was deliciously eaten."

Here, the speech recognition error correction apparatus may correct an erroneous speech recognition result without a rearrangement process according to a language model, The rearrangement process refers to rearranging a word order at the time of translation, because word orders are different from language to language. For example, if English is translated into Korean, 'I have an apple' may be translated into "나는 가졌다 사과를", and "나는 가졌다 사과를" may be rearranged into "나는 사과를 가졌다" according to the rearrangement process by the language model. The speech recognition error correction method is for correcting an error in the same language, so the speech recognition error correction apparatus does not perform the rearrangement process above.

Figure 8:
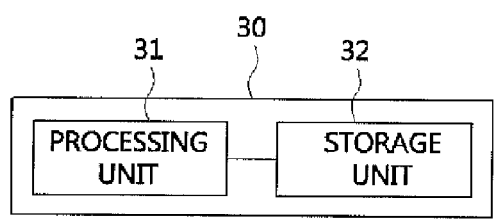
FIG. 8 is a block diagram illustrating a speech recognition error correction apparatus according to an embodiment of the present invention.

FIG. 8 is a block diagram illustrating a speech recognition error correction apparatus according to an embodiment of the present invention.

With reference to FIG. 8, the speech recognition error correction apparatus 30 includes a processing unit 31 and a storage unit 32. The processing unit 31 may determine a likelihood that a speech recognition result is erroneous based on a language model learned through a correct answer corpus and a domain corpus, and if the likelihood that the speech recognition result is erroneous is higher than a predetermined standard, may generate a parallel corpus based on whether a speech recognition result matches a correct answer corpus, generate a speech recognition model based on a parallel corpus, and correct an erroneous speech recognition result based on the speech recognition model and the language model. The storage unit 32 may store information to be processed and information processed in the processing unit 31.

The processing unit 31 may determine a likelihood that a speech recognition result is erroneous based on step 100 described above. Specifically, the processing unit 31 may determine likelihood of error using the language model learned through the high-capacity domain corpus and the correct answer corpus relating to the speech recognition result. Here, the N-gram may be used as the language model, and specifically, the bigram or the trigram may be used.

For example, if the speech recognition result is "an apple deliciously ate", the processing unit 31 may calculate the likelihood of generating "an apple deliciously", "deliciously ate" through the bigram, and calculate the likelihood of generating "an apple deliciously ate" through the trigram. At this point, since the language model was learned through the correct answer corpus, the bigram of "an apple deliciously" has a low likelihood of being generated, and therefore, the processing unit 31 may determine "an apple deliciously" as a syntax having a high likelihood of error. As a result, the processing unit 31 may determine that "an apple deliciously ate" is a syntax having high likelihood of error.

The processing unit 31 may generate a parallel corpus based on step 200 described above. Specifically, the processing unit 31 may detect a correct answer pair based on step 210 described above. For example, since "an apple" of the speech recognition result in the second row of Table 1 is the same as "'an apple" of the correct answer corpus, the processing unit 31 may detect "an apple" as a correct answer pair. Further, since "a poison was put" of the speech recognition result in the third row of Table 1 is the same as "a poison was put" of the correct answer corpus, the processing unit 31 may detect "a poison was put" as a correct answer pair.

The processing unit 31 may detect the incorrect answer pair based on step 220 described above. For example, since "reduce" of the speech recognition result in the second row of Table 1 and "red" of the correct answer corpus are not the same, the processing unit 31 may detect "reduce, red" as an incorrect answer pair. Further, since "of an apple" of the speech recognition result in the third row of Table 1 and "into an apple" of the correct answer corpus are not the same, the processing unit 31 can detect "of an apple, into an apple" as an incorrect answer pair.

The processing unit 31 may generate the parallel corpus based on step 230, and may generate an extended parallel corpus including the correct answer corpus, the speech recognition result, the correct answer pair, and the incorrect answer pair as presented in Table 2.

The processing unit 31 may generate the speech recognition model based on step 300 described above. Specifically, the processing unit 31 may detect a first syntax before speech recognition based on step 310 described above, detect a second syntax after speech recognition based on step 320, calculate a speech recognition rate among syntaxes based on step 330 described above, and generate the speech recognition model based on step 340 described above.

That is, the processing unit 31 may generate the speech recognition model as illustrated in FIG. 5. The processing unit 31 may generate a matrix by setting the first syntax (for example, the correct answer corpus) as rows, and setting the second syntax (for example, the speech recognition result) corresponding to the first syntax as columns, and generate the first speech recognition model by indicating cells in which the first syntax is highly likely to be recognized as the second syntax in black.

The processing unit 31 may generate a matrix by setting a first syntax (for example, a speech recognition result) as columns, and setting a second syntax (for example, a correct answer corpus) corresponding to the first syntax as rows, and may generate a second speech recognition model by indicating, in black, cells in which the first syntax is highly likely to be recognized as the second syntax.

The processing unit 31 may generate a final speech recognition model by combining the first speech recognition model and the second speech recognition model.

The processing unit 31 may correct an erroneous speech recognition result based on step 400 described above. Specifically, the processing unit 31 may generate a graph according to correspondence relations among syntaxes based on step 410 described above, detect second syntaxes (that is, speech recognition results) corresponding to the first syntaxes (that is, correct answer corpuses), respectively, as illustrated in FIG. 7, and generate a graph according to the correspondence relations of the first syntaxes and the second syntaxes.

The processing unit 31 may detect a route with minimum errors based on step 420 described above, and detect a route with minimum errors through known technology (for example, a viterbi search).

The processing unit 31 may correct an erroneous speech recognition result based on step 430 described above. That is, the processing unit 31 may compare the speech recognition result and the detected route, and correct the speech recognition result based on the detected route, if there is difference according to the comparison result. For example, if the speech recognition result is "an apple deliciously ate" and the detected route is "an apple was deliciously eaten", the speech recognition error correction apparatus may correct the speech recognition result to "an apple was deliciously eaten."

The function performed by the processing unit 31 may be performed in a processor (for example, a Central Processing Unit (CPU) and/or a Graphics Processing Unit (GPU)).

Figure 9:
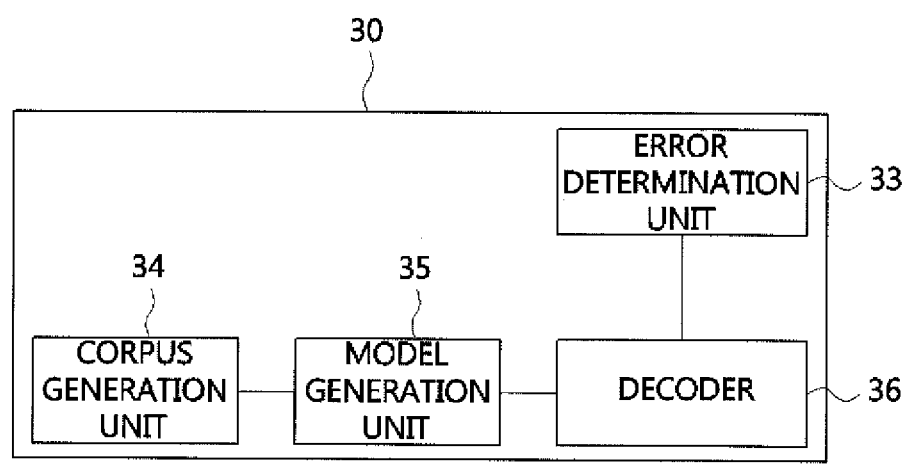
FIG. 9 is a block diagram illustrating a speech recognition error correction apparatus according to another embodiment of the present invention.

FIG. 9 is a block diagram illustrating a speech recognition error correction apparatus according to another embodiment of the present invention.

With reference to FIG. 9, the speech recognition error correction apparatus 30 includes an error determination unit 33, a corpus generation unit 34, a model generation unit 35, and a decoder 36. The speech recognition error correction apparatus 30 illustrated in FIG. 9 is substantially the same as the speech recognition error correction apparatus 30 illustrated in FIG. 8.

The error determination unit 33 may determine the likelihood that the speech recognition result is erroneous based on step 100 described above. The corpus generation unit 34 may generate the parallel corpus based on step 200. The model generation unit 35 may generate the speech recognition model based on step 300 described above. The decoder 36 may correct an erroneous speech recognition result based on step 400.

The functions performed by the error determination unit 33, the corpus generation unit 34, the model generation unit 35, and the decoder 36 may be substantially performed by a processor (for example, a CPU and/or a GPU).

Further, the error determination unit 33, the corpus generation unit 34, the model generation unit 35, and the decoder 36 may be implemented as one integrated form, one physical apparatus, or one module. Further, the error determination unit 33, the corpus generation unit 34, the model generation unit 35, and the decoder 36 may be implemented as a plurality of physical apparatuses or groups, not only one physical apparatus or group.

Various embodiments of the present invention may be implemented as program code that can be recorded in a computer-readable recording medium and executed by a computer. The computer-readable recording medium may include program commands, data files, data structures, etc., individually or in combination. The program code recorded in the computer-readable recording medium may be designed specifically for the present invention or may be well-known to those of ordinary skill in the art. Examples of the computer-readable recording medium include hardware devices such as read-only memory (ROM), random-access memory (RAM), or flash memory, formed specifically to store and execute program code. Examples of the program code include machine code made by a compiler and high-level language codes that may be executed by a computer by using an interpreter. The aforementioned hardware devices may include one or more software modules in order to execute operations of the present invention and vice versa.

While the example embodiments of the present invention and their advantages have been described in detail, it should be understood that various changes, substitutions and alterations may be made herein without departing from the scope of the invention as defined by the appended claims.

What is claimed is:

1. A speech recognition error correction method performed by a speech recognition error correction apparatus, the method comprising:
   determining a likelihood that a speech recognition result is erroneous based on a language model learned through a correct answer corpus and a domain corpus;
   generating a parallel corpus according to whether the speech recognition result matches the correct answer corpus, if the likelihood that the speech recognition result is erroneous is higher than a predetermined standard;
   generating a speech recognition model based on the parallel corpus; and
   correcting an erroneous speech recognition result based on the speech recognition model and the language model;
   wherein the generating of the parallel corpus includes detecting a correct answer pair from the correct answer corpus and the speech recognition result, detecting an incorrect answer pair from the correct answer corpus and the speech recognition result, and generating the parallel corpus based on the correct answer corpus, the speech recognition result, the correct answer pair, and the incorrect answer pair,
   wherein if text included in the incorrect answer pair is included in the correct answer pair, the incorrect answer pair including the text is not detected as the incorrect answer pair, and
   wherein the generating of the speech recognition model includes detecting a first syntax before speech recognition from the parallel corpus, detecting a second syntax after speech recognition from the parallel corpus, calculating a speech recognition rate between the first syntax and the second syntax, and generating the speech recognition model based on the first syntax, the second syntax, and the speech recognition rate.

2. The method of claim 1, wherein the determining of the likelihood that a speech recognition result is erroneous includes determining a likelihood that a speech recognition result is erroneous based on likelihood of generating the speech recognition result.

3. The method of claim 1, wherein the correcting of the erroneous speech recognition result includes:
   generating a graph according to a correspondence relation between the first syntax and the second syntax;
   detecting a route with minimum errors from the graph; and
   correcting the erroneous speech recognition result based on the detected route.

4. The method of claim 3, wherein the generating of the graph includes assuming that a certain second syntax is a certain first syntax if the certain first syntax corresponding to the certain second syntax does not exist.

5. The method of claim 3, wherein the correcting of the erroneous speech recognition result based on the detected route includes correcting the erroneous speech recognition result without a rearrangement process according to the language model.

6. A speech recognition error correction apparatus, comprising:
   a processing unit configured to determine a likelihood that a speech recognition result is erroneous based on a language model learned through a correct answer corpus and a domain corpus, and if the likelihood that the speech recognition result is erroneous is higher than a predetermined standard, generate a parallel corpus according to whether the speech recognition result matches the correct answer corpus generate a speech recognition model based on the parallel corpus, and correct an erroneous speech recognition result based on the speech recognition model and the language model; and
   a storage unit configured to store information to be processed and information processed in the processing unit;
   wherein the processing unit detects a correct answer pair from the correct answer corpus and the speech recognition result, detects an incorrect answer pair from the correct answer corpus and the speech recognition result, and generates the parallel corpus based on the correct answer corpus, the speech recognition result, the correct answer pair, and the incorrect answer pair, and
   wherein if text included in the incorrect answer pair is included in the correct answer pair, the processing unit does not detect the incorrect answer pair including the text as the incorrect answer pair, and wherein the processing unit detects a first syntax before speech recognition from the parallel corpus, detects a second syntax after speech recognition from the parallel corpus, calculates a speech recognition rate between the first syntax and the second syntax, and generates the speech recognition model based on the first syntax, the second syntax, and the speech recognition rate.

7. The speech recognition error correction apparatus of claim 6, wherein the processing unit determines the likelihood that a speech recognition result is erroneous based on likelihood of generating the speech recognition result.

8. The speech recognition error correction apparatus of claim 6, wherein the processing unit generates a graph according to a correspondence relation between the first syntax and the second syntax; detects a route with minimum errors from the graph; and corrects the erroneous speech recognition result based on the detected route.

9. The speech recognition error correction apparatus of claim 8, wherein the processing unit generates the graph assuming that a certain second syntax is a certain first syntax if the certain first syntax corresponding to the certain second syntax does not exist.

10. The speech recognition error correction apparatus of claim 8, wherein the processing unit corrects the erroneous speech recognition result without a rearrangement process according to the language model.

* * * * *